(12) United States Patent
Covey et al.

(10) Patent No.: US 11,450,519 B2
(45) Date of Patent: Sep. 20, 2022

(54) SAMPLING INTERFACE FOR A MASS SPECTROMETER

(71) Applicant: DH Technologies Development Pte. Ltd., Singapore (SG)

(72) Inventors: Thomas R Covey, Newmarket (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 0 days.

(21) Appl. No.: 16/972,925

(22) PCT Filed: Jun. 7, 2019

(86) PCT No.: PCT/IB2019/054777
§ 371 (c)(1),
(2) Date: Dec. 7, 2020

(87) PCT Pub. No.: WO2019/234708
PCT Pub. Date: Dec. 12, 2019

(65) Prior Publication Data
US 2021/0249246 A1 Aug. 12, 2021

Related U.S. Application Data

(60) Provisional application No. 62/681,729, filed on Jun. 7, 2018.

(51) Int. Cl.
*H01J 49/00* (2006.01)
*H01J 49/16* (2006.01)
(Continued)

(52) U.S. Cl.
CPC ........ *H01J 49/167* (2013.01); *G01N 30/7233* (2013.01); *H01J 49/0404* (2013.01); *H01J 49/0431* (2013.01); *H01J 49/0495* (2013.01)

(58) Field of Classification Search
CPC .. H01J 49/167; H01J 49/0404; H01J 49/0431; H01J 49/0495; H01J 49/165; G01N 30/7233
(Continued)

(56) References Cited

U.S. PATENT DOCUMENTS 6,326,616 B1 * 12/2001 Andrien, Jr. .......... H01J 49/107
250/288
2014/0326872 A1 * 11/2014 Van Berkel ......... H01J 49/0459
250/288
(Continued)

FOREIGN PATENT DOCUMENTS

| CA | 3035743 A1 | 3/2018 |
| KR | 1020160086361 A | 7/2016 |
| WO | 2018069872 A1 | 4/2018 |

OTHER PUBLICATIONS

International Search Report and Written Opinion for PCT/IB2019/054777 dated Oct. 29, 2019.
(Continued)

*Primary Examiner* — Michael Maskell

(57) ABSTRACT

Sampling probes and interfaces for mass spectrometry systems and methods are described to analyze a composition of a substance. The system includes a liquid reservoir containing solvent; a gas reservoir containing nebulizer gas; a conduit that is in fluid communication with the liquid reservoir, the conduit comprising a first and second portion and a junction portion, the first and second portion being joined at the junction portion, and defining an angle therebetween at the junction and the junction portion contains an aperture that is open to the atmosphere. A nebulizer conduit that is co-axial and partially surrounds the second portion and completely surrounds an end of the second portion can also be present, the nebulizer conduit being fluidly connected to the gas reservoir and that allows a gas to flow from
(Continued)

the gas reservoir over an external surface of the second portion and the end of the second portion.

20 Claims, 5 Drawing Sheets

(51) Int. Cl.
   *G01N 30/72* (2006.01)
   *H01J 49/04* (2006.01)
(58) Field of Classification Search
   USPC .......................................... 250/281, 282, 288
   See application file for complete search history.

(56) References Cited

U.S. PATENT DOCUMENTS

2016/0126080 A1   5/2016   Kertesz et al.
2017/0025262 A1   1/2017   Xu et al.

OTHER PUBLICATIONS

Neu Volker et al: "Characterization of a miniaturized liquid bridge for nL sample infusion: a comparative study of sample flush-out behavior using flow simulations and direct ESI-MS analysis", Microfluidics and Nanofluidics, Springer Berlin Heidelberg, Berlin/Heidelberg, vol. 20, No. 4, Mar. 30, 2016, pp. 1-11.
Supplementary European Search Report EP Application No. 19814414 (dated Feb. 9, 2022).

* cited by examiner

SAMPLING INTERFACE FOR A MASS SPECTROMETER

RELATED APPLICATIONS

This application claims the benefit of priority from U.S. Provisional Application No. 62/681,729, filed on Jun. 7, 2018, the entire contents of which are incorporated by reference herein.

FIELD

The present teachings generally relate to mass spectrometry, and more particularly to sampling probes and sampling interfaces for mass spectrometry systems and methods.

INTRODUCTION

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Given its sensitivity and selectivity, MS is particularly important in life science applications.

In the analysis of complex sample matrices (e.g., biological, environmental, and food samples), many current MS techniques require extensive pre-treatment steps to be performed on the sample prior to MS detection/analysis of the analyte of interest. Such pre-analytical steps can include sampling (i.e., sample collection) and sample preparation (separation from the matrix, concentration, fractionation and, if necessary, derivatization). It has been estimated, for example, that more than 80% of the overall analytical process can be spent on sample collection and preparation in order to enable the analyte's detection via MS or to remove potential sources of interference contained within the sample matrix, while nonetheless increasing potential sources of dilution and/or error at each sample preparation stage.

Ideally, sample preparation techniques for MS should be fast, reliable, reproducible, inexpensive, and in some aspects, amenable to automation. One recent example of an improved sample preparation technique is solid-phase microextraction (SPME), which essentially integrates sampling, sample preparation, and extraction into a single solvent-free step. Generally, SPME devices utilize a fiber or other surface (e.g., blades, micro-tips, pins, or mesh) coated with an extracting phase to which analytes within the sample can be preferentially adsorbed when the device is inserted into the sample. Because extraction can take place in situ by inserting a biocompatible device directly into tissue, blood, or other biological matrix for a short period of time, SPME does not require any sample collection. Alternatively, SPME devices can be used for ex vivo analysis using a small amount of a collected sample (i.e., a sample aliquot).

Though SPME is generally considered to be accurate and simple and can result in decreased sample preparation time and disposal costs, the mass-spectrometric based analysis of SPME-prepared samples may nonetheless require additional equipment and/or time-consuming steps in order to ionize the analyte from the SPME device directly or to desorb the analytes from the SPME device prior to ionization as required for mass spectrometry (MS). By way of example, various ionization methods have been developed that can desorb/ionize analytes from condensed-phase samples with minimal sample handling (e.g., desorption electrospray ionization (DESI) and direct analysis in real time (DART), which "wipe-off" analytes from the samples by exposing their surfaces to an ionizing medium such as a gas or an aerosol). However, such techniques can also require sophisticated and costly equipment.

Alternatively, additional desorption steps have been utilized to extract the analytes from the SPME device prior to ionization via ionization techniques other than DESI or DART. For example, because electrospray ionization (ESI) is one of the most common ionization methods and requires the analyte to be in solution, some users have utilized liquid desorption and subsequent purification/separation of the extracted/enriched analytes via high-performance liquid chromatography (HPLC) prior to MS analysis. However, liquid desorption prior to HPLC may require several minutes to transfer the analyte from the SPME coating to the liquid phase due to requirements imposed on the HPLC mobile phase (weak solvent strength). Moreover, as discussed above, these increased sample-preparation/separation steps can decrease throughput, introduce potential sources of error, increase dilution, and cannot be easily automated. Alternatively, some groups have proposed substantial modifications to the standard electrospray ion source. Typically in ESI, a liquid sample is continuously discharged into an ionization chamber from within an electrically conductive capillary, while an electric potential difference between the capillary and a counter electrode generates a strong electric field within the ionization chamber that electrically charges the liquid sample. This electric field causes the liquid discharged from the capillary to disperse into a plurality of charged micro-droplets drawn toward the counter electrode if the charge imposed on the liquid's surface is strong enough to overcome the surface tension of the liquid (i.e., the particles attempt to disperse the charge and return to a lower energy state). As solvent within the micro-droplets evaporates during desolvation in the ionization chamber, charged analyte ions can then enter a sampling orifice of the counter electrode for subsequent mass spectrometric analysis. PCT Pub. No. WO2015188282 entitled "A Probe For Extraction Of Molecules Of Interest From A Sample," which is incorporated by reference herein in its entirety, for example, thus purports to provide for electrospray ionization from an SPME device by applying the ionizing electric potential to the conductive SPME device itself (to which a discrete amount of a desorption solution is applied) such that ions are generated directly from the edges of the wetted substrate.

In addition, mass spectrometry sampling interfaces for liquid samples containing analytes of interest are also highly desired in the field. U.S. Pat. No. 9,632,066 discloses an open port sampling interface that can be used for liquid droplets. There remains a need for improved and/or reduced-cost systems that enable fast-coupling of SPME and droplet dispenser devices to MS systems with minimal alterations to the front-end while maintaining sensitivity, simplicity, selectivity, speed and throughput.

SUMMARY

Devices, methods, and systems for delivering a sample to an ion source for the generation of ions and subsequent analysis by mass spectrometry are provided herein.

In certain embodiments, a system for sampling a composition of a substance that can be analyzed in a mass spectrometer is provided, comprising: (a) a liquid reservoir containing a solvent; (b) a gas reservoir containing a nebulizer gas; (c) a conduit that is in fluid communication with the liquid reservoir, the conduit comprising a first portion, a second portion and a junction portion, the first portion and second portion being joined at the junction portion, and defining an angle therebetween at the junction, and the junction portion contains an aperture through a wall of the junction portion to open an interior of the conduit to atmosphere to receive and pass sample from the atmosphere into the interior of the conduit; and (d) a nebulizer conduit that is co-axial and partially surrounds the second portion and completely surrounds a discharge end of the second portion, the nebulizer conduit being fluidly connected to the gas reservoir and that allows the nebulizer gas to flow from the gas reservoir over an external surface of the second portion and the discharge end of the second portion to draw solvent through the second portion by creating a suction force.

In some embodiments the conduit comprises a continuous tube of a same material and the first portion, second portion, and junction portion may comprise portions of a common section. In some embodiments, the first portion, second porting and junction portion may comprise separate segments that are mechanically connected or fused together. In some embodiments, the aperture may comprise a hole drilled or cut through one side of the conduit to provide the opening through the wall of the conduit to the interior of the conduit.

In certain embodiments, the angle between the first and second portions is at least 20 degrees and in certain embodiments, the angle is about 120 degrees and in some embodiments the angle is about 180 degrees.

In certain embodiments, the system further comprises an electrode disposed at the end of the second portion and wherein an electric field is created between the end of the second portion and a counter electrode.

In certain embodiments, one side of the junction portion is defined by the angle between the first and second portions and the other side of the junction portion contains the aperture.

In certain embodiments, the system further comprises a mass analyzer and wherein an entrance to the mass analyzer is the counter electrode. In some embodiments, the system may also comprise a differential mobility spectrometer and the discharge end of the conduit may discharge the solvent and sample passed through the aperture and captured in the solvent flow into the differential mobility spectrometer.

In certain embodiments, the system further comprising a droplet dispenser configured to dispense a droplet of the substance into the aperture. In some cases, the droplet dispenser may comprise an acoustic droplet dispenser. In some aspects, the droplet dispenser may comprise a pneumatic droplet dispenser. In some aspects, the droplet dispenser may comprise a capillary delivering a metered flow of sample.

In certain embodiments, the system further comprises a substrate and wherein the substance is a solid that is applied to the substrate. In other embodiments, the system comprises a substrate and wherein the substance is a liquid that is applied to the substrate.

In certain embodiments, the aperture is disposed at any position on the joint portion. In some embodiments, the conduit may be positioned to orient the aperture facing down such that sample may be delivered to the aperture in an upward trajectory against the force of gravity. In some embodiments, the conduit may be positioned to orient the aperture facing up such that sample may be delivered to the conduit in a downward trajectory falling with the force of gravity. In some embodiments, the conduit may be adjustable to allow for re-positioning the aperture relative to a sample delivery trajectory.

In certain embodiments, a method for analyzing a composition of a substance is described which comprises: (a) providing a liquid reservoir containing a solvent; (b) providing a gas reservoir containing a nebulizer gas; (c) providing a conduit that is in fluid communication with the liquid reservoir, the conduit comprising a first portion, a second portion and a junction portion, the first portion and second portion being joined at the junction portion, and defining an angle therebetween at the junction, and the junction portion contains an aperture that is open to the atmosphere and; (d) providing a nebulizer conduit that is co-axial and partially surrounds the second portion and completely surrounds an end of the second portion, the nebulizer conduit being fluidly connected to the gas reservoir and that allows the nebulizer gas to flow from the gas reservoir over an external surface of the second portion and the end of the second portion; (e) flowing the solvent through the conduit from the liquid reservoir through the first portion, the junction and to the end of the second portion; (f) flowing the nebulizer gas through the nebulizer conduit so as to cause aspiration of solvent exiting the end of the second portion; (g) contacting the substance to the flowing solvent at the aperture.

In certain embodiments, the method further comprises providing an electrode disposed at the end of the second portion and wherein an electric field is created between the electrode and a counter electrode and wherein the electric field is sufficient to cause ionization of the substance.

In certain embodiments, one side of the junction portion is defined by the angle between the first and second portions and the other side of the junction portion contains the aperture In certain embodiments, wherein the angle is at least 20 degrees or is 20 degrees. In other embodiments, the angle is 180 degrees.

In certain embodiments, the method further comprises providing a mass analyzer and performing a mass analysis on the substance and wherein an entrance to the mass analyzer is the counter electrode.

In certain embodiments, the method further comprises providing a differential mobility spectrometer and performing a differential mobility separation on the substance.

In certain embodiments, the method further comprises providing a droplet dispenser and having the droplet dispenser dispense a droplet of the substance into the aperture. In some embodiments, the droplet dispenser is an acoustic droplet dispenser. In some embodiments, the droplet of the substance is immiscible with the solvent In certain embodiments, the method further comprises providing a solid surface and applying the substance to the solid surface and then contacting the solid surface with the substance to the solvent in the aperture. In some embodiments, the substance is a solid and in other embodiments, the substance is a liquid.

In certain embodiments, the aperture is disposed at any position of the joint portion.

In certain embodiments, a conduit in fluid communication with a liquid reservoir that provides a continuous liquid pathway from the liquid reservoir to a discharge end of the conduit, the conduit comprising: a first supply portion supplying solvent from the liquid reservoir to an aperture portion positioned between the liquid reservoir and the discharge end; and a second discharge portion receiving the supplied solvent at the aperture portion and delivering the supplied solvent to the discharge end of the conduit, the aperture portion comprising an opening through a portion of a wall of the conduit that exposes liquid flowing through the conduit to atmosphere.

BRIEF DESCRIPTION OF THE DRAWINGS

The skilled person in the art will understand that the drawings, described below, are for illustration purposes only. The drawings are not intended to limit the scope of the applicant's teachings in any way.

DETAIL DESCRIPTION OF EMBODIMENTS

Figure 1:
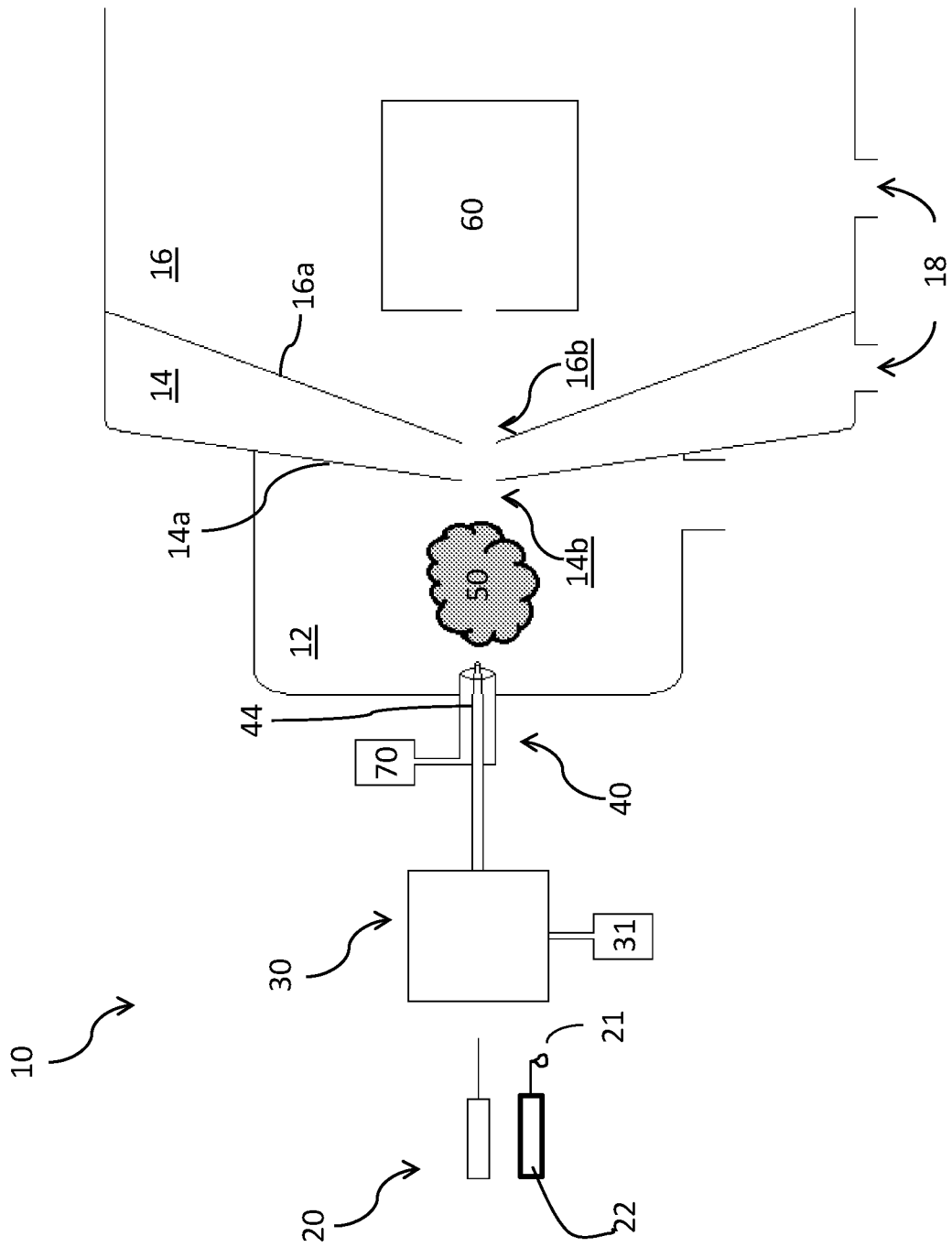
FIG. 1, in a schematic diagram, illustrates an exemplary system comprising a sampling interface fluidly coupled to an electrospray ion source of a mass spectrometer system in accordance with various aspects of the applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

In accordance with various aspects of the applicant's teachings, MS-based analytical systems and methods are provided herein in which a solvent utilized in a sampling interface to desorb one or more analyte species from an SPME device is fluidly coupled to an ion source for ionizing the one or more analyte species desorbed into the desorption solvent for subsequent mass spectrometric analysis (e.g., without a liquid chromatography (LC) column between the sampling interface and the ion source) or alternatively, the solvent is utilized to capture a droplet being dispensed by a droplet dispenser. Whereas current methods for ionizing liquid samples derived from SPME devices often utilize complex sample preparation steps in which SPME-extracted analytes are first desorbed from the SPME device and subsequently subject to additional sample processing steps (e.g., concentration/purification via LC) that are not amenable to automation prior to ionization/mass spectrometric analysis, systems and methods in accordance with various aspects of the present teachings provide a simplified workflow in which the SPME devices having one or more analytes adsorbed thereon can be coupled directly to the ion source of an MS system. In various aspects, the systems and methods described herein can eliminate the need for one or more time-consuming sample preparation steps while enabling fast coupling of SPME devices to the MS system (and fast desorption therefrom), with minimal alterations to the front-end of known systems, while nonetheless maintaining sensitivity, simplicity, selectivity, speed, and throughput. Moreover, in various aspects, the present teachings can enable a fully- or partially automated workflow, thereby further increasing throughput while potentially eliminating sources of human error in the analysis of SPME-derived samples. As discussed in detail below, devices, methods, and systems in accordance with various aspects of the present teachings provide SPME devices, droplet dispenser and/or sampling interfaces optimized relative to one another so as to increase the sensitivity of the SPME-based workflow.

FIG. 1 schematically depicts an embodiment of an exemplary system 10 in accordance with various aspects of the applicant's teachings for ionizing and mass analyzing SPME-extracted analytes or droplets containing analytes. As shown in FIG. 1, the exemplary system 10 generally includes a substance sampling probe 30 (e.g., an open port probe) in fluid communication with an ion source 40 for discharging a liquid containing one or more sample analytes into an ionization chamber 12, and a mass analyzer 60 in fluid communication with the ionization chamber 12 for downstream processing and/or detection of ions generated by the ion source. As will be discussed in more detail below, the substance sampling probe 30 can be generally configured to receive at least a portion of a substrate (e.g., SPME substrate 20) having a surface coated with an extraction phase to which one or more analytes from a sample are adsorbed and which is placed in a fluid pathway in the substance sampling probe 30 extending between a liquid reservoir containing a solvent (ie, solvent source) 31 and the ion source probe (e.g., electrospray electrode 44). In this manner, analytes desorbed from the coated surface of the solid substrate 20 by the solvent flow directly to the ion source 40 within the desorption solvent for ionization thereby. The substrate sampling probe 30 can be alternatively generally configured to receive a droplet 21 containing one or more analytes from a sample to be analyzed, the droplet 21 being dispensed from a droplet dispenser (eg. syringe 22) or alternatively, liquids can be inserted into the substance sampling probe by contacting a liquid substance with the solvent at the opening.

In the depicted embodiment, the ionization chamber 12 can be maintained at an atmospheric pressure, though in some embodiments, the ionization chamber 12 can be evacuated to a pressure lower than atmospheric pressure. The ionization chamber 12, within which analytes desorbed from the solid substrate 20 or analytes from liquid-phase samples 21 and contained in the solvent that is discharged from the electrospray electrode 44 can be ionized, is separated from a gas curtain chamber 14 by a plate 14a having a curtain plate aperture 14b. As shown, a vacuum chamber 16, which houses the mass analyzer 60, is separated from the curtain chamber 14 by a plate 16a having a vacuum chamber sampling orifice 16b. The curtain chamber 14 and vacuum chamber 16 can be maintained at a selected pressure(s) (e.g., the same or different sub-atmospheric pressures, a pressure lower than the ionization chamber) by evacuation through one or more vacuum pump ports 18.

The ion source 40 can have a variety of configurations but is generally configured to generate analyte contained within a liquid (e.g., the solvent) that is received from the substrate sampling probe 30. In the exemplary embodiment depicted in FIG. 1, an electrospray electrode 42, which can comprise a capillary fluidly coupled to the substance sampling probe 20, terminates in an outlet end that at least partially extends into the ionization chamber 12 and discharges the solvent therein. As will be appreciated by a person skilled in the art in light of the present teachings, the outlet end of the electrospray electrode 44 can atomize, aerosolize, nebulize, or otherwise discharge (e.g., spray with a nozzle) the solvent into the ionization chamber 12 to form a sample plume 50 comprising a plurality of micro-droplets generally directed toward (e.g., in the vicinity of) the curtain plate aperture 14b and vacuum chamber sampling orifice 16b. As is known in the art, analytes contained within the micro-droplets can be ionized (i.e., charged) by the ion source 40, for example, as the sample plume 50 is generated. By way of non-limiting example, the outlet end of the electrospray electrode 44 can be made of a conductive material and electrically coupled to a pole of a voltage source (not shown), while the other pole of the voltage source can be grounded. Micro-droplets contained within the sample plume 50 can thus be charged by the voltage applied to the outlet end such that as the solvent within the droplets evaporates during desolvation in the ionization chamber 12, bare charged analyte ions are released and drawn toward and through the apertures 14b, 16b and focused (e.g., via one or more ion lens) into the mass analyzer 60. Though the ion source probe is generally described herein as an electrospray electrode 44, it should be appreciated that any number of different ionization techniques known in the art for ionizing liquid samples and modified in accordance with the present teachings can be utilized as the ion source 40. By way of non-limiting example, the ion source 40 can be an electrospray ionization device, a nebulizer assisted electrospray device, a chemical ionization device, a nebulizer assisted atomization device, a photoionization device, a laser ionization device, a thermospray ionization device, or a sonic spray ionization device.

With continued reference to FIG. 1, the mass spectrometer system 10 can optionally include a source 70 of pressurized gas (e.g. nitrogen, air, or noble gas) in the form of a reservoir that supplies a high velocity nebulizing gas flow which surrounds the outlet end of the electrospray electrode 44 and interacts with the fluid discharged therefrom to enhance the formation of the sample plume 50 and the ion release within the plume for sampling by 14b and 16b, e.g., via the interaction of the high speed nebulizing flow and jet of liquid sample. The nebulizer gas can be supplied at a variety of flow rates, for example, in a range from about 0.1 L/min to about 20 L/min. The flow of the nebulizer gas over the external surface of the outlet end of the electrospray electrode creates a vacuum (suction) force which assists in drawing solvent from the substance sampling probe to the tip.

It will also be appreciated by a person skilled in the art and in light of the teachings herein that the mass analyzer 60 can have a variety of configurations. Generally, the mass analyzer 60 is configured to process (e.g., filter, sort, dissociate, detect, etc.) sample ions generated by the ion source 40. By way of non-limiting example, the mass analyzer 60 can be a triple quadrupole mass spectrometer, or any other mass analyzer known in the art and modified in accordance with the teachings herein. It will further be appreciated that any number of additional elements can be included in the mass spectrometer system including, for example, an ion mobility spectrometer (e.g., a differential mobility spectrometer) that is configured to separate ions based on their mobility through a drift gas rather than their mass-to-charge ratio. Additionally, it will be appreciated that the mass analyzer 60 can comprise a detector that can detect the ions which pass through the analyzer 60 and can, for example, supply a signal indicative of the number of ions per second that are detected.

Figure 2:
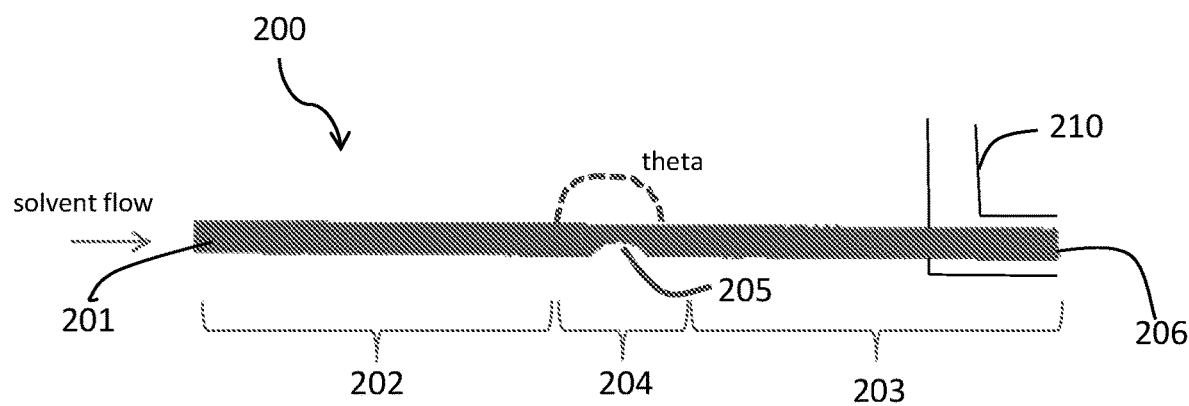
FIG. 2 is a exemplified embodiment of a linear open port probe.

Now referring to FIG. 2, an exemplary substance sampling probe is depicted. The sampling probe 200 comprises a conduit 201 that is in fluid communication with the liquid reservoir 31 (not shown), the conduit 201 comprising a first portion 202 (e.g. supply portion), a second portion 203 (e.g. discharge portion) and a junction portion 204 (e.g. aperture portion), the first portion 202 and second portion 203 being joined at the junction portion 204, and defining an angle theta therebetween. In some embodiments the conduit 201 comprises a continuous tube of a same material and the first portion 202, second portion 203, and junction portion 204 may comprise portions of a common section of the material. In some embodiments, the first portion 202, second portion 203 and junction portion 204 may comprise separate segments that are mechanically connected or fused together at the joints. In some embodiments, the aperture 205 may comprise a hole drilled or cut through one side of the conduit 201 to provide the opening through the wall of the conduit 201 to the interior of the conduit 201. Referring to FIG. 2, the aperture 205 extends through a portion of the conduit 201 and does not extend about the circumference of the conduit 201. In this way a continuous liquid flow path is maintained at the aperture 205 and liquid flowing through the conduit 201 flows across the aperture 205 such that sample passing through the opening travels on an approximately perpendicular trajectory to the liquid flow. The size of the aperture 205 is preferably as small as may be provided and still repeatedly receive input sample and allow passage into the interior of the conduit 201.

In some embodiments, the angle between the first and second portions is 180 degrees, and the junction portion contains an aperture 205 that is open to the atmosphere. A nebulizer conduit 210 that is co-axial and partially surrounds the second portion 203 and completely surrounds a discharge end 206 of the second portion, the nebulizer conduit 210 being fluidly connected to a gas reservoir 70 and that allows a gas to flow from the gas reservoir over an external surface of the second portion 203 and the discharge end 206 of the second portion 203. Upon solvent flowing from the liquid reservoir 31 through conduit 201, a portion of the solvent will be accessible through the aperture 205, but due to the small size of the aperture 205, orientation of the first 202 and second 203 portions of the conduit 201, the relative angle therebetween, the surface tension of the solvent and the slight vacuum draw through the second portion 203 generated by the nebulizing gas movement flowing over the end 206 of the second conduit, solvent that would be expected to leak from the aperture 205 is maintained within the conduit 201 such that the aperture 205 can be used as a sampling port. In some embodiments, the direction of solvent flow through the junction portion 204 at the aperture 205 is across the face of the aperture 205. In some embodiments, the aperture/sampling port 205 can be defined or is formed by removing a portion of a wall of the conduit 201 in the junction portion 204. In some aspects the aperture 205 extends less than half of a circumference of the wall of the conduit 201 at a position in the junction portion 204.

Such a sampling port can be made for example by creating a small hole in a piece of polytetrafluoroethylene (eg. Teflon) tubing and connecting the Teflon tubing to an external electrospray tip. It should be appreciated that while the use of the singular term conduit is recited herein that such a conduit can be made up of one or more different pieces made from differing materials but that are themselves conduits, and are otherwise connected together in series. For example, the Teflon conduit may be connected together in series with a metal conduit that defines an electrospray tip. Such a combination of the Teflon tubing and capillary should be understood to be a conduit within the meaning of the present description.

While this example particularly exemplifies an angle that is 180 degrees (ie, a linear open port probe), it should be appreciated that such an orientation is not absolutely required. More particularly, in some embodiments, the present inventors have found that solvent does not leak from the aperture when the angle (theta) between the first portion and the second portion is at least 20 degrees. This occurs even when the aperture is downward facing to receive sample travelling against the force of gravity. Thus an upside down orientation of the open port probe is possible where gravity would be expected to cause leakage through the aperture.

Figure 3:
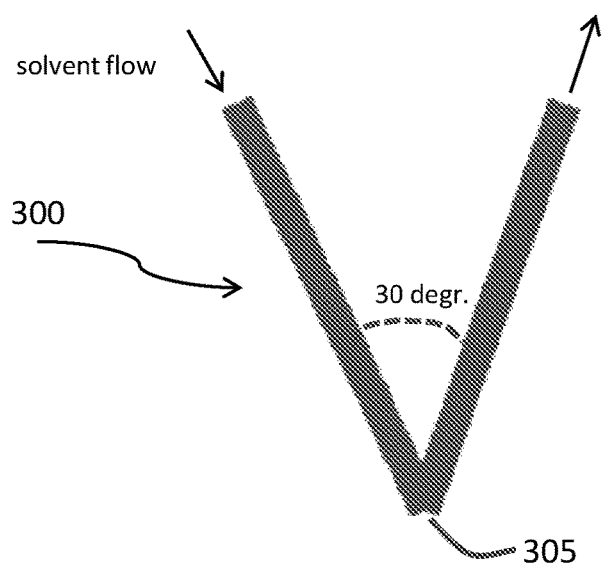
FIG. 3 is an embodiment of a bent open port probe.

Now referring to FIG. 3, an alternative embodiment of the instantly described invention is described which demonstrates a sampling probe 300 where the angle (theta) between the first and second portions is 20 degrees and that no leakage of solvent from the aperture 305 is seen. One side of the junction portion is defined by the angle between the first and second portions and the other side of the junction portion contains the aperture, thus the aperture is directly opposite the side of the conduit that forms the angle between the first and second portions. By having at least one portion of a wall of the conduit be continuous between the first and second portions, solvent is assisted in being maintained within the conduit as it transfers from the first portion 202 to the second portion 203 through the junction portion 204. In some embodiments, the aperture/sampling port can be defined or is formed by removing a portion of a wall of the conduit 201 in the junction portion 204. In some aspects the aperture 205 extends less than half of a circumference of the wall of the conduit 201 at a position in the junction portion 204. In some cases, the cross sectional area of the first and second portions define an area through which the solvent passes and are the substantially the same between the first and second portions such that a velocity of the solvent through the first portion, the solvent and the second portion is substantially the same.

Figure 4:
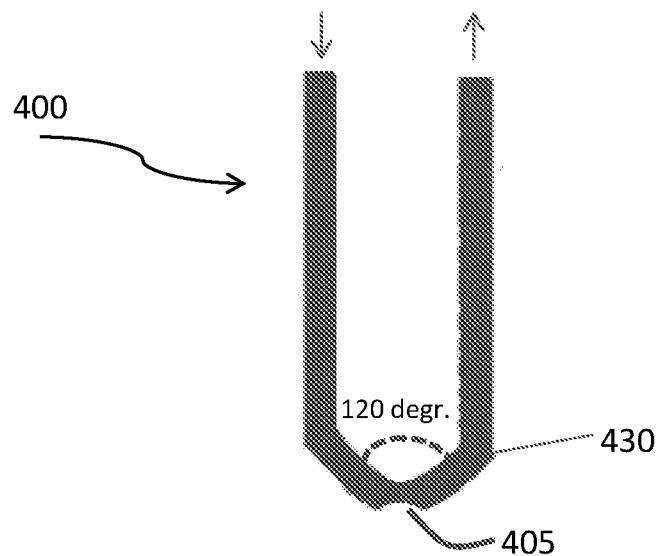
FIG. 4 is another embodiment of a bent open port probe.

Now referring to FIG. 4, an alternative embodiment of the sampling probe 400 is depicted in which an angle between the first and second portions at the junction portion is 120 degrees. FIG. 4 demonstrate an alternative embodiment where the conduit and more particular the first and second portions are not entirely linear, but rather the first and/or second portion may itself comprise one or more additional bends 430. As would be appreciated the significance of the angle between the first and second portion herein described is the angle between the two portions at the junction. As should be appreciated, while specific examples of 20, 120 and 180 degrees have been specifically exemplified, it should be understood than all angles between 20 and 180 and fractions therefore are intended to be included within the present teachings. In some embodiments, the junction need not have a shape defined edge but can include a general radius of curvature that includes the angle.

Figure 5:
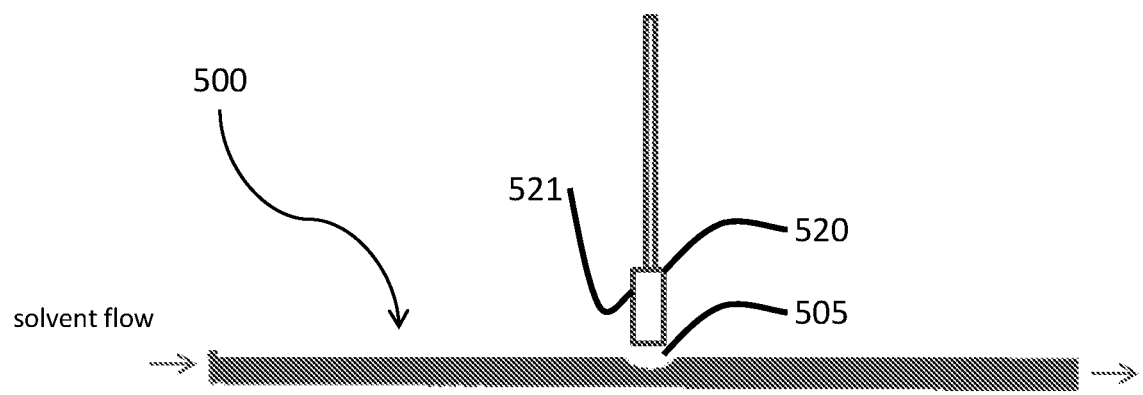
FIG. 5 demonstrates the functioning of a SPME fiber being sampled into a linear open port probe.

Referring to FIG. 5, an alternative embodiment of the sampling probe 500 is depicted similar to that of the embodiment described in FIG. 2, but with the aperture 505 facing upwards. A substrate 520 containing a SPME material 521 coated thereon was previously contacted with a material to be analyzed and a portion of the material was adsorbed onto the SPME material. The substrate is then inserted into the aperture 505 with the solvent flowing through. Upon insertion, the substance being analyzed is desorbed from the SPME material 521 and into the solvent for further analysis.

Figure 7:
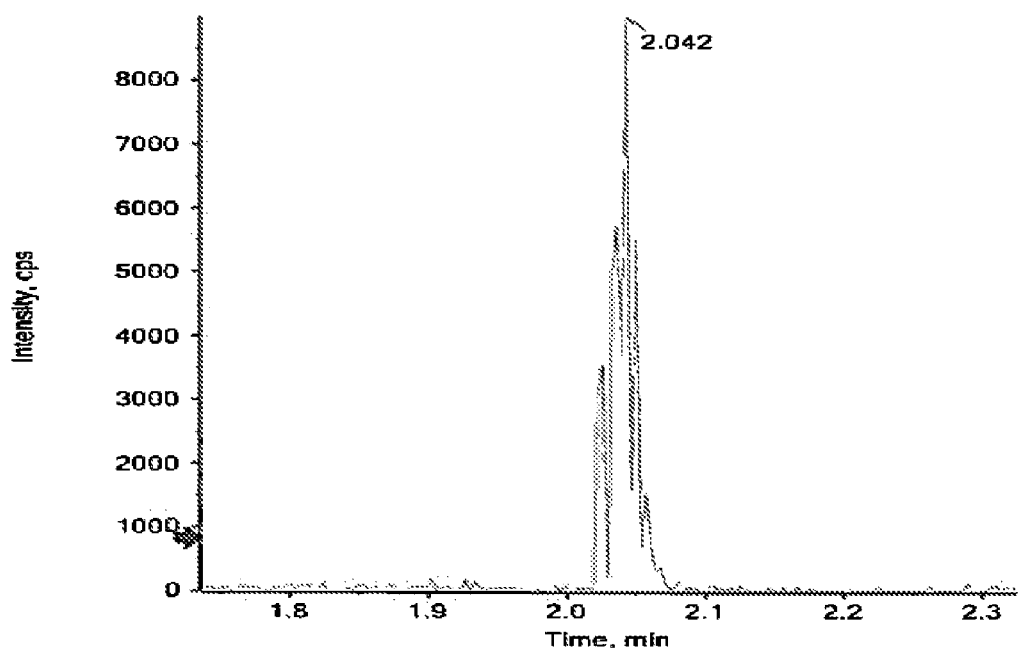
FIG. 7 depicts a plot of signal obtained with the usage of SPME fiber measured using an embodiment of the device of the instant invention.
Figure 8:
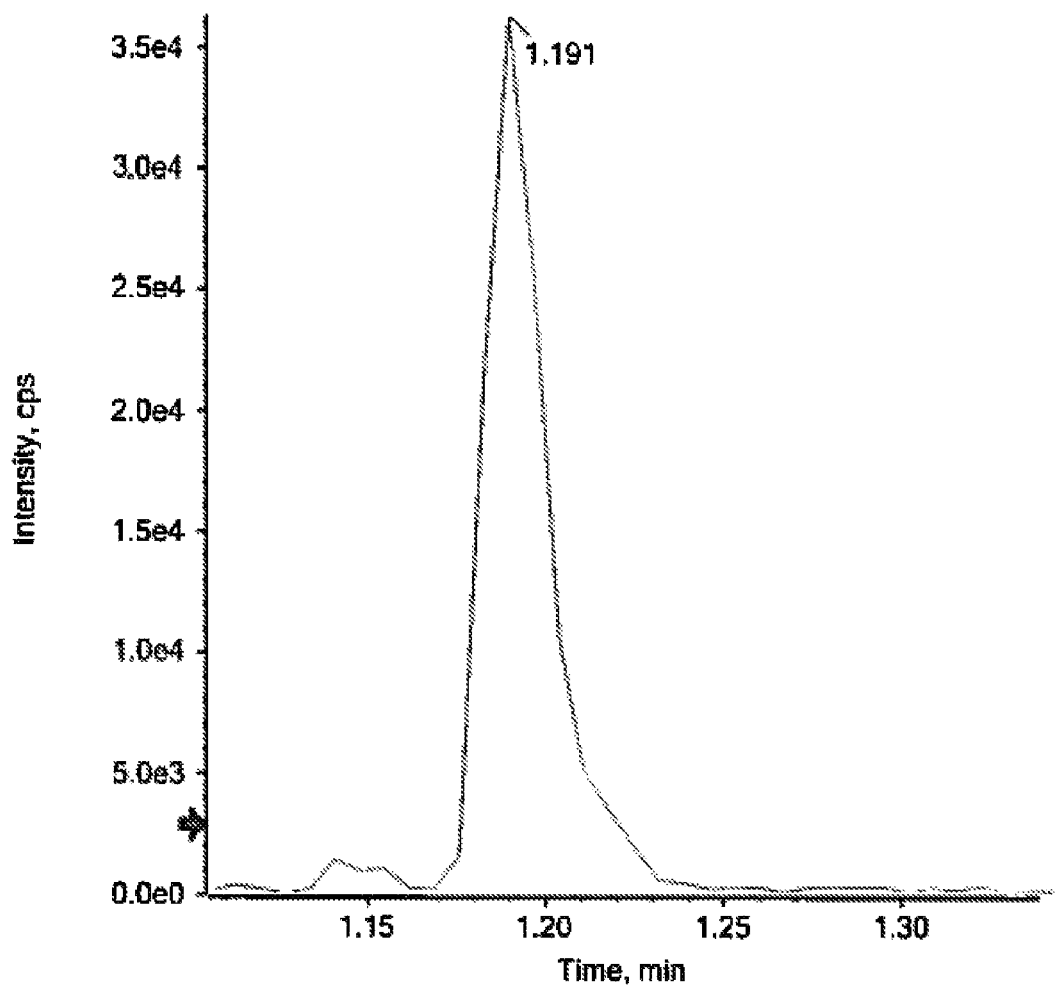
FIG. 8 depicts a plot of signal obtained with the usage of SPME fiber measured using an embodiment of the device of the instant invention.

FIGS. 7 and 8 demonstrate mass spectrometer signals utilizing embodiments of the invention wherein a SPME fiber is introduced into an open port probe in a similar manner depicted in FIG. 5 where a SPME fiber is inserted into a sample to be analyzed and then inserted into the aperture of a linear open port probe. In particular, FIG. 7 demonstrate the signal from monitoring a single transition of an analyte whereas FIG. 8 depicts the total ion current for the monitoring of four MS transitions.

Figure 6:
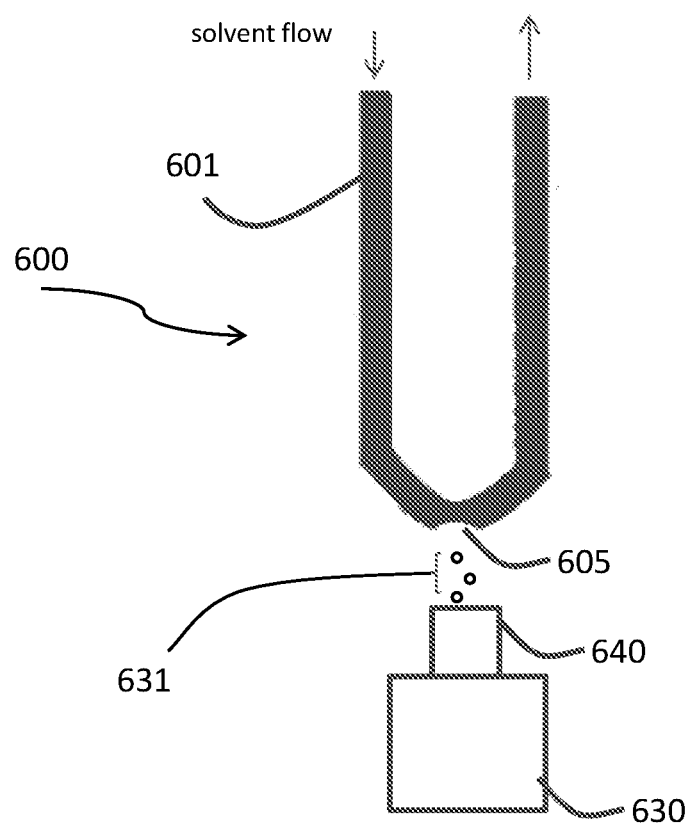
FIG. 6 demonstrates the functioning of an acoustic droplet injector inserting droplets into a bent open port probe.

Referring now to FIG. 6, an alternative embodiment of the sampling probe 600 is depicted similar to that of the embodiment described in FIG. 4. A droplet dispenser such as for example an acoustic droplet dispenser 630, for example, those which are depicted within U.S. Pat. No. 6,666,541, generates one or more droplets 631 which are directed in an upward motion towards the aperture 605 where the drops mix with the solvent. In some embodiments, the direction of solvent flow through the conduit at the aperture 605 is substantially perpendicular to the trajectory of the one or more droplets 631 being emitted from the droplet dispenser and passing through the aperture 205 into the interior of the conduit 201. In alternative embodiments, the droplets are not miscible with the solvent flowing through the conduit 601. In such cases, the droplets form an emulsion within the solvent. In such cases, the droplets form a higher concentration upon analysis in a mass spectrometer since they are not diluted by the solvent. In addition to the use of a dispenser such as an acoustic droplet injector, pneumatic droplet ejector, or metered flow from a capillary, the aperture 205 of the sampling probe 600 may be directly contacted with a liquid or solid sample and the liquid or solid sample being sampled directly by the solvent.

As an alternative to direct liquid injection, the present teachings allow for a liquid sample to be injected into the aperture 205 via an acoustic liquid droplet dispenser disposed, for example, under sample wells (e.g., a micro-titer plate) on the specimen stage. Alternatively, a tube for delivering the droplets from the acoustic transducer to the sampling probe could instead be actuated, as opposed to the sample plate itself. An exemplary acoustic liquid handling device suitable for use with the present system is marketed under the name Echo® 525 liquid handler manufactured by LabCyte, Inc. of Sunnyvale, Calif., which includes an acoustic transducer capable of ejecting a droplet vertically from a liquid sample well 640. In certain aspects, the acoustic dispenser can be disposed below the "upside down" sampling probe 600 (and directly below an ion source 40, which can also be oriented vertically) to eject the droplets from the sample wells substantially vertically against the force of gravity into the probe's aperture 205, where the solvent flows substantially horizontally through the junction portion of the conduit at the aperture (e.g. where the trajectory of the ejected droplets is substantially perpendicular to the direction of the solvent flow through the conduit at the aperture). Such embodiments avoid long fluid transfer lines associated with an orientation in which both the acoustic dispenser and sampling interface are above the ion source and/or separated therefrom by a large distance. Such an orientation can enable the use of shorter liquid transport lines, relatively smaller diameter tubing, lower flow rates, shorter analysis time, and decreased nebulizer flow to the ion source 40, which often generates the negative pressure that drives the fluid from the sampling conduit of the sampling probe 600. Additionally, because the acoustic dispenser provides contactless transfer, the risk of carryover between samples can be reduced. In some aspects, such as where the conduit 201 comprises a continuous segment of material, the manufacture and installation within an integrated system may be simplified over more complicated sampling probe configurations such as co-axial tube sampling probes.

In addition, the use of an acoustic dispenser for liquid sampling into the probe 600 can additionally enable the use of different carrier fluids (other than the desorption solvent otherwise discussed herein). For example, by using a carrier fluid that is immiscible with the sample, the acoustic dispenser can eject small aqueous sample droplets (e.g., as small as 2.5 nL) into the distal fluid chamber of the "upside-down" probe 600 and maintain the droplets concentration over the length of the transport line (e.g., sampling conduit) to the ion source due to the immiscibility between the sample and the carrier fluid, thereby preventing significant dilution of the liquid sample plug and providing a significantly sharper peak being detected at the mass spectrometer. By way of example, the carrier fluid can be mineral oils, Fluorinert, or other suitable liquids that are immiscible with the liquid sample. For example, while dilutions of about 1000× would be typical when using a transfer line of approximately 50 cm, by keeping the injected volume at 2.5 nL and reducing the transport line to about 10 cm using an "upside-down" configuration, sub-attomole detection limits can be obtained in a very short time frame (e.g., a few seconds) for each sample. It has been demonstrated that the MS signal generated from plugs of sample droplets within immiscible oil provide a sharp contrast between the leading and trailing edge of the sample plug, as described for example in an article entitled "Label free screening of enzyme inhibitors at femtomole scale using segmented flow electrospray ionization mass spectrometry," authored by Sun et al. and published in Analytical Chemistry 84(13), 5794-5800 (2012), which is incorporated by reference in its entirety.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

The invention claimed is:

1. A system for sampling a composition of a substance that can be analyzed in a mass spectrometer, the sampling system comprising:
    (a) a liquid reservoir containing a solvent;
    (b) a gas reservoir containing a nebulizer gas;
    (c) a conduit that is in fluid communication with the liquid reservoir, the conduit comprising a first portion, a second portion and a junction portion, the first portion and second portion being joined at the junction portion, and defining an angle therebetween at the junction, and the junction portion containing an aperture through a wall of the junction portion to open an interior of the conduit to atmosphere to receive and pass sample from the atmosphere to the interior of the conduit; and
    (d) a nebulizer conduit that is co-axial and partially surrounds the second portion and completely surrounds a discharge end of the second portion, the nebulizer conduit being fluidly connected to the gas reservoir and that allows the nebulizer gas to flow from the gas reservoir over an external surface of the second portion and the discharge end of the second portion to draw solvent through the second portion.

2. The system of claim 1 wherein the angle between the first and second portions is at least 20 degrees.

3. The system of claim 1 further comprising an electrode disposed at the end of the second portion and wherein an electric field is created between the end of the second portion and a counter electrode.

4. The system of claim 1 wherein one side of the junction portion is defined by the angle between the first and second portions and the other side of the junction portion contains the aperture.

5. The system of claim 1 wherein the angle is 180 degrees.

6. The system of claim 3 further comprising a mass analyzer and wherein an entrance to the mass analyzer is the counter electrode.

7. The system of claim 1 further comprising a differential mobility spectrometer, and wherein the discharge end of the conduit is operative to discharge the solvent and captured sample into the differential mobility spectrometer.

8. The system of claim 1 further comprising a droplet dispenser configured to dispense a droplet of the substance into the aperture.

9. The system of claim 8, wherein the droplet dispenser is selected from the group consisting of: an acoustic droplet dispenser, a pneumatic droplet dispenser, and a capillary delivering a metered flow of sample.

10. The system of claim 1 further comprising a substrate and wherein the substance is a solid that is applied to the substrate.

11. The system of claim 1 further comprising a substrate and wherein the substance is a liquid that is applied to the substrate.

12. The system of claim 1 wherein the aperture is disposed at any position on the joint portion.

13. The system of claim 1, wherein the conduit comprises a continuous tube of a same material.

14. The system of claim 1, wherein the conduit comprising the first portion, second portion and junction portion comprise separate segments that are mechanically connected or fused together.

15. A method for sampling a composition of a substance into a mass spectrometer, comprising:
    (a) providing a liquid reservoir containing a solvent;
    (b) providing a gas reservoir containing a nebulizer gas;
    (c) providing a conduit that is in fluid communication with the liquid reservoir, the conduit comprising a first portion, a second portion and a junction portion, the first portion and second portion being joined at the junction portion, and defining an angle therebetween at the junction, and the junction portion contains an aperture through a wall of the junction portion to open an interior of the conduit to atmosphere;
    (d) providing a nebulizer conduit that is co-axial and partially surrounds the second portion and completely surrounds a discharge end of the second portion, the nebulizer conduit being fluidly connected to the gas reservoir and that allows the nebulizer gas to flow from the gas reservoir over an external surface of the second portion and the discharge end of the second portion;

(e) flowing nebulizer gas through the nebulizer conduit over the discharge end to create a suction force in the second portion;

(f) contacting the substance to the flowing solvent at the aperture.

16. The method of claim 15, further comprising providing an electrode disposed at the end of the second portion and wherein an electric field is created between the electrode and a counter electrode, wherein the electric field is sufficient to cause ionization of the substance.

17. The method of claim 15 wherein one side of the junction portion is defined by the angle between the first and second portions and the other side of the junction portion contains the aperture.

18. The method of claim 15 wherein the angle is at least 20 degrees, optionally wherein the angle is 180.

19. The method of claim 15 further comprising providing a mass analyzer and performing a mass analysis on the substance and wherein an entrance to the mass analyzer is the counter electrode.

20. The method of claim 15 further comprising providing a droplet dispenser and having the droplet dispenser dispense a droplet of the substance into the aperture.

\* \* \* \* \*